United States Patent
Chun et al.

(10) Patent No.: US 8,347,174 B2
(45) Date of Patent: Jan. 1, 2013

(54) METHOD OF TRANSMITTING AND RECEIVING DATA IN A WIRELESS COMMUNICATION SYSTEM INCLUDING ERROR DETECTION CODE DECODED USING EQUIPMENT IDENTIFIERS AND GROUP IDENTIFIERS

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 502 days.

(21) Appl. No.: 12/448,803

(22) PCT Filed: Jan. 9, 2008

(86) PCT No.: PCT/KR2008/000138
§ 371 (c)(1),
(2), (4) Date: Jul. 8, 2009

(87) PCT Pub. No.: WO2008/084985
PCT Pub. Date: Jul. 17, 2008

(65) Prior Publication Data
US 2010/0088580 A1    Apr. 8, 2010

(30) Foreign Application Priority Data
Jan. 9, 2008   (KR) .................. 10-2008-0002547

(51) Int. Cl.
G06F 11/00   (2006.01)
G06F 11/10   (2006.01)
(52) U.S. Cl. ........... 714/758; 714/52; 370/342; 370/345
(58) Field of Classification Search .................... 714/49, 714/52, 758; 370/342, 345
See application file for complete search history.

(56) References Cited

U.S. PATENT DOCUMENTS 6,374,115 B1 *  4/2002  Barnes et al. ................. 455/520
6,470,391 B2   10/2002  Takamoto et al.
(Continued)

FOREIGN PATENT DOCUMENTS

CN          1595362          3/2005
(Continued)

OTHER PUBLICATIONS $3^{rd}$ Generation Partnership Project: Technical Specification Group Radio Access Network, Physical Layers Aspects for Evolved UTRA (Release 7), 3GPP TR 25.814, v1.5.0, May 2006.

(Continued)

*Primary Examiner* — Joseph Schell
(74) *Attorney, Agent, or Firm* — McKenna Long & Aldridge LLP

(57) ABSTRACT

A method for transmitting data from a network to a user equipment in a wireless communication system is provided. The network adds an error detection code, generated using a first identifier allocated to the user equipment, to scheduling information for data to be transmitted to the user equipment and transmits the scheduling information to which the error detection code has been added to the user equipment. The network also adds an error detection code, generated using a second identifier allocated to the user equipment, to the data to be transmitted to the user equipment and transmits the data to which the error detection code has been added to the user equipment.

6 Claims, 7 Drawing Sheets

U.S. PATENT DOCUMENTS

| | | | |
|---|---|---|---|
| 6,665,313 B1 | 12/2003 | Chang et al. | |
| 6,697,347 B2 | 2/2004 | Ostman et al. | |
| 6,778,501 B1 | 8/2004 | Malmgren et al. | |
| 7,006,464 B1 | 2/2006 | Gopalakrishnan et al. | |
| 7,054,288 B2 | 5/2006 | Sternberg et al. | |
| 7,158,504 B2 | 1/2007 | Kadaba et al. | |
| 7,295,573 B2 | 11/2007 | Yi et al. | |
| 7,359,924 B2 | 4/2008 | Balachandran et al. | |
| 7,542,457 B2 | 6/2009 | Wu | |
| 7,590,181 B2 * | 9/2009 | Awad et al. | 375/259 |
| 7,593,694 B2 | 9/2009 | Michel et al. | |
| 7,623,483 B2 | 11/2009 | Yi et al. | |
| 7,639,644 B2 | 12/2009 | Sternberg et al. | |
| 7,646,742 B2 | 1/2010 | Petrovic et al. | |
| 7,650,559 B2 | 1/2010 | Nishibayashi et al. | |
| 7,743,310 B2 | 6/2010 | Nishibayashi et al. | |
| 7,764,661 B2 | 7/2010 | Heo et al. | |
| 7,801,563 B2 | 9/2010 | Hara et al. | |
| 7,844,884 B2 | 11/2010 | Roh et al. | |
| 7,848,279 B2 * | 12/2010 | Ranta-aho et al. | 370/328 |
| 7,894,390 B2 * | 2/2011 | Nakamata et al. | 370/329 |
| 7,912,471 B2 | 3/2011 | Kodikara Patabandi et al. | |
| 8,054,786 B2 | 11/2011 | Wu et al. | |
| 8,054,788 B2 | 11/2011 | Ma et al. | |
| 8,059,681 B2 | 11/2011 | Kim et al. | |
| 8,090,390 B2 | 1/2012 | Lee et al. | |
| 8,208,492 B2 | 6/2012 | Kim et al. | |
| 2002/0170013 A1 * | 11/2002 | Bolourchi et al. | 714/758 |
| 2002/0174276 A1 | 11/2002 | Jiang | |
| 2003/0040314 A1 | 2/2003 | Hogan et al. | |
| 2003/0095519 A1 | 5/2003 | Kuo et al. | |
| 2003/0152083 A1 | 8/2003 | Nagata et al. | |
| 2003/0157953 A1 | 8/2003 | Das et al. | |
| 2003/0181221 A1 | 9/2003 | Nguyen | |
| 2003/0210669 A1 | 11/2003 | Vayanos et al. | |
| 2003/0214935 A1 | 11/2003 | Khan et al. | |
| 2003/0231612 A1 | 12/2003 | Kim et al. | |
| 2004/0103435 A1 | 5/2004 | Yi et al. | |
| 2004/0228294 A1 | 11/2004 | Kim et al. | |
| 2004/0266461 A1 | 12/2004 | Beckmann et al. | |
| 2005/0039101 A1 | 2/2005 | Torsner | |
| 2005/0083943 A1 * | 4/2005 | Lee et al. | 370/395.4 |
| 2005/0111487 A1 | 5/2005 | Matta et al. | |
| 2005/0207343 A1 | 9/2005 | Han | |
| 2005/0220116 A1 * | 10/2005 | Ahn et al. | 370/395.4 |
| 2005/0237960 A1 | 10/2005 | Kim | |
| 2005/0250506 A1 | 11/2005 | Beale et al. | |
| 2006/0018294 A1 | 1/2006 | Kynaslahti et al. | |
| 2006/0067238 A1 | 3/2006 | Olsson et al. | |
| 2006/0092911 A1 | 5/2006 | Hwang et al. | |
| 2006/0092973 A1 | 5/2006 | Petrovic et al. | |
| 2006/0114877 A1 * | 6/2006 | Heo et al. | 370/342 |
| 2006/0140158 A1 | 6/2006 | Terry | |
| 2006/0148411 A1 | 7/2006 | Cho et al. | |
| 2006/0183429 A1 * | 8/2006 | Anderson | 455/67.13 |
| 2006/0203760 A1 | 9/2006 | Fukui et al. | |
| 2006/0245386 A1 | 11/2006 | Hu | |
| 2006/0251019 A1 | 11/2006 | Halsgaard et al. | |
| 2006/0251105 A1 | 11/2006 | Kim et al. | |
| 2006/0268919 A1 * | 11/2006 | Malladi et al. | 370/432 |
| 2007/0014229 A1 | 1/2007 | Hepler et al. | |
| 2007/0047452 A1 | 3/2007 | Lohr et al. | |
| 2007/0064602 A1 | 3/2007 | Jiang | |
| 2007/0091810 A1 | 4/2007 | Kim et al. | |
| 2007/0254679 A1 | 11/2007 | Montojo et al. | |
| 2007/0293222 A1 | 12/2007 | Vikberg et al. | |
| 2008/0045272 A1 | 2/2008 | Wang et al. | |
| 2008/0056148 A1 | 3/2008 | Wu | |
| 2008/0056183 A1 | 3/2008 | Gorokhov et al. | |
| 2008/0084844 A1 | 4/2008 | Reznik et al. | |
| 2008/0101270 A1 | 5/2008 | Kekki et al. | |
| 2008/0101280 A1 | 5/2008 | Gholmieh et al. | |
| 2008/0117891 A1 | 5/2008 | Damnjanovic et al. | |
| 2008/0165724 A1 | 7/2008 | Wu et al. | |
| 2008/0165755 A1 | 7/2008 | Marinier et al. | |
| 2008/0273610 A1 | 11/2008 | Malladi et al. | |
| 2009/0016275 A1 | 1/2009 | Liu et al. | |
| 2009/0028123 A1 | 1/2009 | Terry et al. | |
| 2009/0088185 A1 * | 4/2009 | Beale | 455/458 |
| 2009/0143072 A1 * | 6/2009 | Montojo et al. | 455/450 |
| 2009/0221293 A1 | 9/2009 | Petrovic et al. | |
| 2009/0268676 A1 | 10/2009 | Wigard et al. | |
| 2010/0034139 A1 * | 2/2010 | Love et al. | 370/328 |
| 2010/0091721 A1 | 4/2010 | Lamo et al. | |
| 2010/0208667 A1 * | 8/2010 | Chun et al. | 370/329 |
| 2011/0190001 A1 | 8/2011 | Kodikara Patabandi et al. | |

FOREIGN PATENT DOCUMENTS

| | | |
|---|---|---|
| CN | 1805594 A | 7/2006 |
| CN | 1805596 | 7/2006 |
| EP | 1 432 261 | 6/2004 |
| EP | 1 724 948 | 11/2006 |
| EP | 1 755 355 | 2/2007 |
| EP | 1 843 504 | 10/2007 |
| EP | 1 845 649 | 10/2007 |
| EP | 1 845 650 | 10/2007 |
| JP | 2002-247042 | 8/2002 |
| JP | 2002-527945 | 8/2002 |
| JP | 2002-290413 | 10/2002 |
| JP | 2003-304574 | 10/2003 |
| JP | 2005-160079 | 6/2005 |
| JP | 2005-525065 | 8/2005 |
| JP | 2006-121282 | 5/2006 |
| JP | 2006-121394 | 5/2006 |
| JP | 2006-148490 | 6/2006 |
| JP | 2006-237897 | 9/2006 |
| JP | 2006-524444 | 10/2006 |
| JP | 2006-524969 | 11/2006 |
| JP | 2006-352708 | 12/2006 |
| JP | 2009-535957 | 10/2009 |
| KR | 10-2002-0014939 | 2/2002 |
| RU | 2005-116242 A | 11/2005 |
| RU | 2428819 | 9/2011 |
| WO | WO 97/11566 | 3/1997 |
| WO | WO 98/24250 | 6/1998 |
| WO | WO 02/093296 | 11/2002 |
| WO | WO 03/084095 A1 | 10/2003 |
| WO | WO 03/085874 | 10/2003 |
| WO | WO 03/096149 | 11/2003 |
| WO | WO 03/096567 | 11/2003 |
| WO | WO 2004/017541 A1 | 2/2004 |
| WO | WO 2004/042952 | 5/2004 |
| WO | WO 2005/015801 | 2/2005 |
| WO | WO 2005/048613 A1 | 5/2005 |
| WO | WO 2005/119941 | 12/2005 |
| WO | WO 2005/125252 | 12/2005 |
| WO | WO 2006/022876 | 3/2006 |
| WO | WO 2006/105333 | 10/2006 |
| WO | WO 2006/118418 | 11/2006 |
| WO | WO 2007/068304 | 6/2007 |

OTHER PUBLICATIONS

"Universal Mobile Telecommunications System (UMTS); User Equipment (UE) procedures in idle mode and procedures for cell reselection in connected mode (3GPP TS 25.304 version 7.1.0 Release 7); ETSI TS 125 304", ETSI Standards, Dec. 2006, XP014039981.

"Universal Mobile Telecommunications System (UMTS); High Speed Downlink Packet Access (HSDPA); Overall description; Stage 2 (3GPP TS 25.308 version 7.1.0 Release 7); ETSI TS 125 308", ETSI Standards, LIS, Dec. 2006, XP014039997.

Nokia: "ARQ Operation with HARQ-ARQ Interaction", 3GPP TSG-RAN WG2, R2-062765, Oct. 9, 2006, sections 2-3.

Ericsson: "Uplink HARQ-ARQ Interactions for NACK → ACK Error", 3GP TSG-RAN WG2, R2-063238, Nov. 6, 2006, fig. 1, p. 2.

Samsung: "MAC functions: ARQ", 3GP TSG-RAN WG2, R2-060374, Feb. 13, 2006, section 2.

Herrmann, C. et al., "Improving Packet Loss Probability in the UMTS High-Speed Downlink", IEEE Vehicular Technology Conference, VTC Fall 2003, Oct. 6, 2003, pp. 2655-2659.

Samsung: "DL Control Channel Structure: Overview", 3GPP TSG-RAN WG1, R1-062534, Oct. 9, 2006, sections 1-4.

Ericsson: "E_UTRA Downlink Control Signaling—Open Issues", 3GPP TSG-RAN WG1, R!-061365, May 8, 2006, section 2.

Rapporteur (Motorola): "Report of E-Mail Discussion: DL Scheduling", 3GPP TSG-RAN WG1, R1-063684, Dec. 12, 2006, section 2, annex C.

LG Electronic: "Downlink control signaling", 3GPP TSG_RAN WG!, R1-063177, Nov. 6, 2006, sections 1-2.

Texas Instruments: "Control Channel Structure and Coding in E-UTRA Downlink", 3GPP TSG-RAN WG1, R1-063220, Nov. 6, 2006, sections 1-5.

Sharp: "UE Identity in L1/L2 Control Signaling for Downlink Scheduling Resource Allocation", 3GPP TSG-RAN WG2, R2-061129, May 8, 2006, sections 1-3.

R2-061189: Further discussion on delay enhancements in Re17 3GPP Nokia, TSG-RAN WG2 Meeting #53, Shanghai, China, May 8-12, 2006.

* cited by examiner

METHOD OF TRANSMITTING AND RECEIVING DATA IN A WIRELESS COMMUNICATION SYSTEM INCLUDING ERROR DETECTION CODE DECODED USING EQUIPMENT IDENTIFIERS AND GROUP IDENTIFIERS

This application claims priority to International Application No. PCT/KR2008/000138 filed on Jan. 9, 2008, which claims priority to Korean Patent Application No. 10-2008-0002547 filed on Jan. 9, 2008 and U.S. Provisional Application Ser. No. 60/884,198 filed on Jan. 9, 2007, both of which are incorporated by reference, as if fully set forth herein.

TECHNICAL FIELD

The present invention relates to a wireless communication system, and more particularly, to a method of transmitting and receiving data in a wireless communication system.

BACKGROUND ART

In a wireless communication system which uses a multi-carrier scheme such as Orthogonal Frequency Division Multiple Access (OFDMA) or Single Carrier-Frequency Division Multiple Access (SC-FDMA), radio resources are defined by a time-frequency region in a two-dimensional space, which is a set of consecutive subcarriers. One time-frequency region is defined by a rectangle determined by time and subcarrier coordinates. That is, one time-frequency region can be defined by at least one symbol in the time domain and multiple subcarriers in the frequency domain. Such a time-frequency region can be allocated to an uplink of a specific User Equipment (UE) or a Base Station (BS) can transmit a time-frequency region to a specific UE in downlink. The number of OFDM symbols in the time domain and the number of sub-carriers, starting from a position located at an offset from a reference point in the frequency domain, should be given in order to define a time-frequency region in the two-dimensional space.

The Evolved Universal Mobile Telecommunications System (E-UMTS) system, which is currently under discussion, uses 10 ms radio frames, each including 20 subframes. That is, each subframe is 0.5 ms long. Each resource block includes one subframe and 12 subcarriers, each of which occupies a 15 kHz band. One subframe includes multiple OFDM symbols. Some (for example, the first symbol) of the OFDM symbols can be used to transmit L1/L2 control information.

FIG. 1 illustrates an example structure of a physical channel used in the E-UMTS system, wherein each subframe includes an L1/L2 control information transport region (hatched in the figure) and a data transport region (not hatched in the figure).

FIG. 2 illustrates a general method for transmitting data in the E-UMTS. A Hybrid Auto Repeat reQuest (HARQ) technique, which is a data retransmission method, is used to improve throughput to perform smooth communication in the E-UMTS.

As shown in FIG. 2, to transmit data to a UE according to the HARQ technique, a NODE B transmits downlink (DL) scheduling information through a DL L1/L2 control channel (for example, a Physical Downlink Control Channel (PD-CCH)). The DL scheduling information may include a UE identifier (UE ID) or a UE group identifier (Group ID), location and duration information of radio resources allocated for downlink data transmission, transmission parameters such as MIMO-related information, payload size, and modulation method, HARQ process information, a redundancy version, and a new data indicator to identify new data.

Basically, the DL scheduling information can be transmitted through a DL L1/L2 control channel even when retransmission is performed and can be changed according to the channel state. For example, the modulation method or payload size can be changed to transmit data at a higher bit rate if the channel state is better than in initial transmission, while it can be changed to transmit data at a lower bit rate if the channel state is worse.

The BS transmits user data to the UE through a channel resource allocated through the DL scheduling information (for example, a Physical Downlink Shared Channel (PD-SCH), which is a physical channel) using the transmission parameters included in the DL scheduling information. The UE monitors a PDCCH every Transmission Time Interval (TTI) to check DL scheduling information destined for the UE and then receives user data transmitted from the BS using the DL scheduling information. Using a UE identifier or a group identifier included in the DL scheduling information, the UE can determine whether or not the DL scheduling information is destined for the UE. When group scheduling using a group identifier is employed, the UE checks scheduling information through a PDCCH using a group identifier allocated to a group including the UE and determines whether or not data received through a PDSCH is destined for the UE using a separate UE identifier allocated to the UE and receives the data if it is destined for the UE.

DISCLOSURE OF THE INVENTION

The group scheduling method requires two separate identifiers, respectively, in order for the UE to receive scheduling information through an L1/L2 control channel and to receive data through a traffic channel. This increases the amount of information transmitted from the BS, thereby wasting radio resources, since the BS must incorporate a separate group or UE identifier into scheduling information and user data using a bitmap format or the like. Even when the group scheduling method is not used, the UE may have to receive scheduling information and user data using a separate UE identifier. The same problem as described above in the group scheduling method may also occur in this case.

An object of the present invention devised to solve the problem lies in providing a method for transmitting and receiving data, which can efficiently use radio resources in a wireless communication system.

In one aspect of the present invention, the object of the present invention can be achieved by providing an apparatus/device a method for transmitting data from a network to a user equipment in a wireless communication system. In this method, the network adds an error detection code, generated using a first identifier allocated to the user equipment, to scheduling information for data to be transmitted to the user equipment and transmits the scheduling information to which the error detection code has been added to the user equipment. The network also adds an error detection code, generated using a second identifier allocated to the user equipment, to the data to be transmitted to the user equipment and transmits the data to which the error detection code has been added to the user equipment.

In another aspect of the present invention, the object of the present invention can also be achieved by providing a method for a user equipment receiving data transmitted from a network in a wireless communication system. In this method, the user equipment receives scheduling information transmitted from the network through a control channel, the scheduling information including an error detection code that has been added to the scheduling information by the network, and then decodes the error detection code added to the scheduling information using a first identifier that the network has allocated to the user equipment. The user equipment then receives data transmitted from the network through a data channel using the scheduling information, the data including an error detection code that has been added to the data by the network, if the decoding of the error detection code added to the scheduling information is successful, and then decodes the error detection code added to the received data using a second identifier that the network has allocated to the user equipment. The user equipment transfers the received data to an upper layer if the decoding of the error detection code added to the data is successful.

EMBODIMENTS

The above and other configurations, operations, and features of the present invention will be easily understood from the embodiments of the invention described below with reference to the accompanying drawings. The embodiments described below are examples wherein technical features of the invention are applied to an Evolved Universal Mobile Telecommunications System (E-UMTS).

Figure 1:
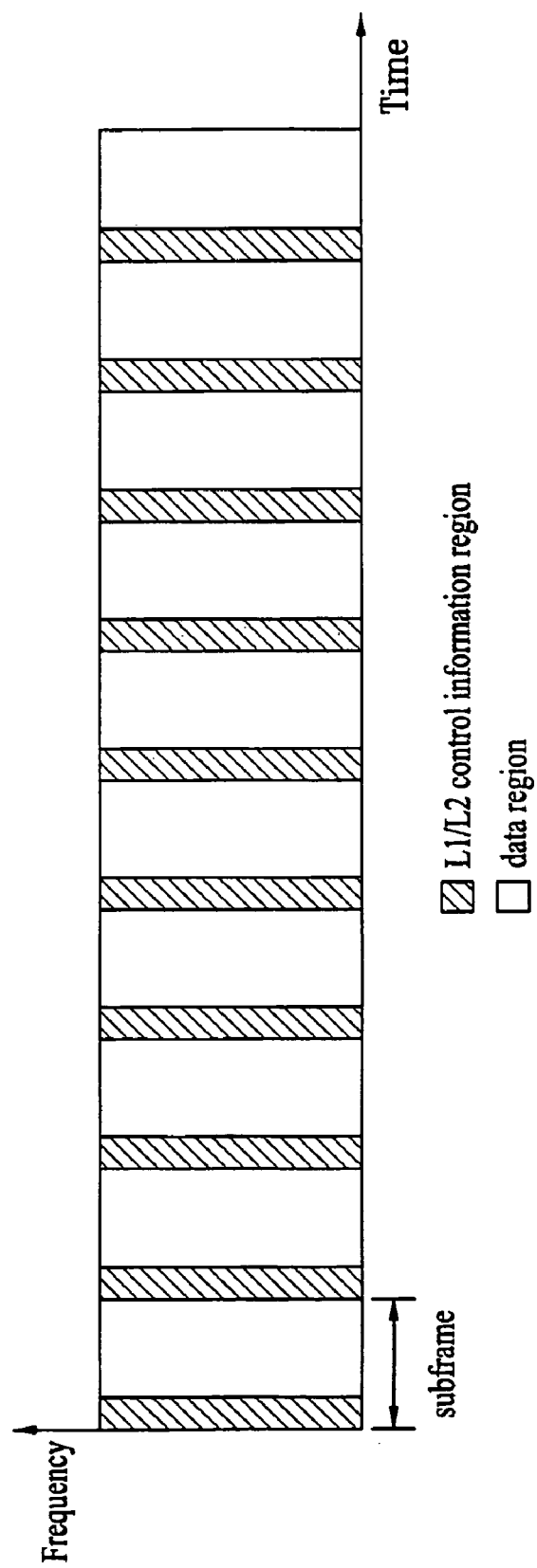
FIG. 1 illustrates an example structure of a physical channel used in an E-UMTS system.
Figure 2:
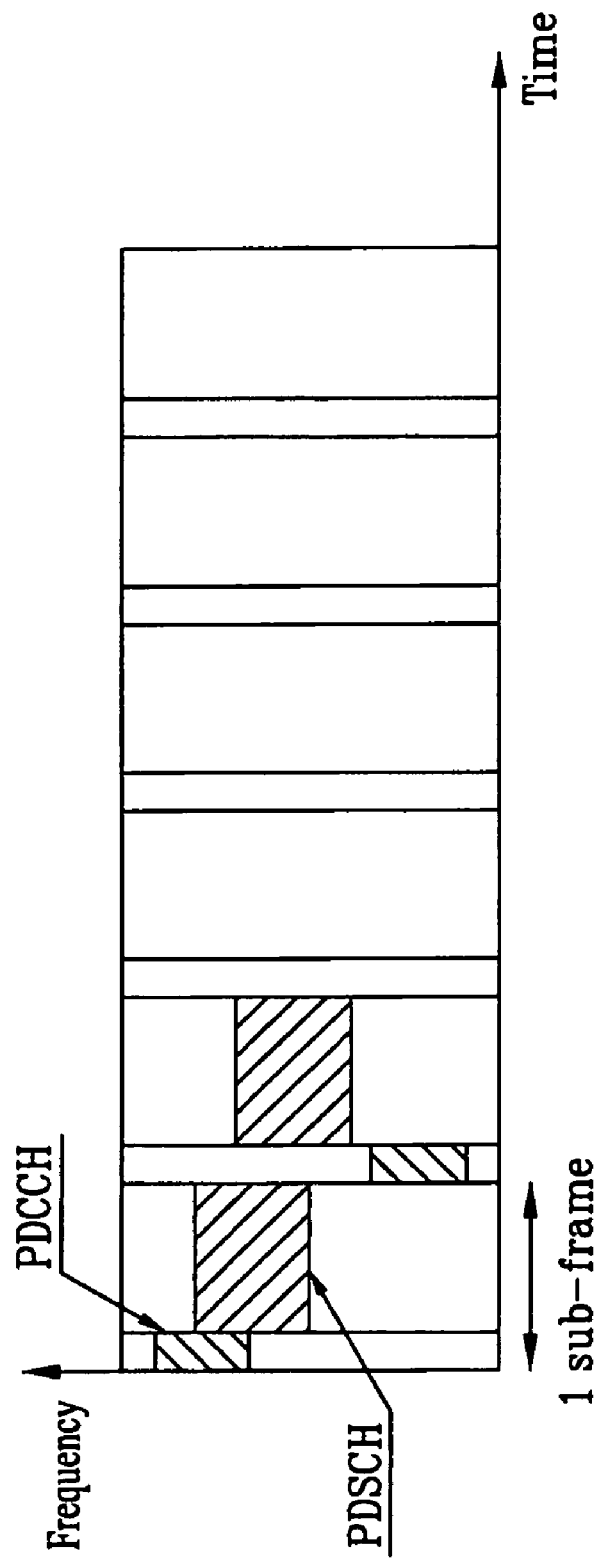
FIG. 2 illustrates a general method for transmitting data in the E-UMTS.
Figure 3:
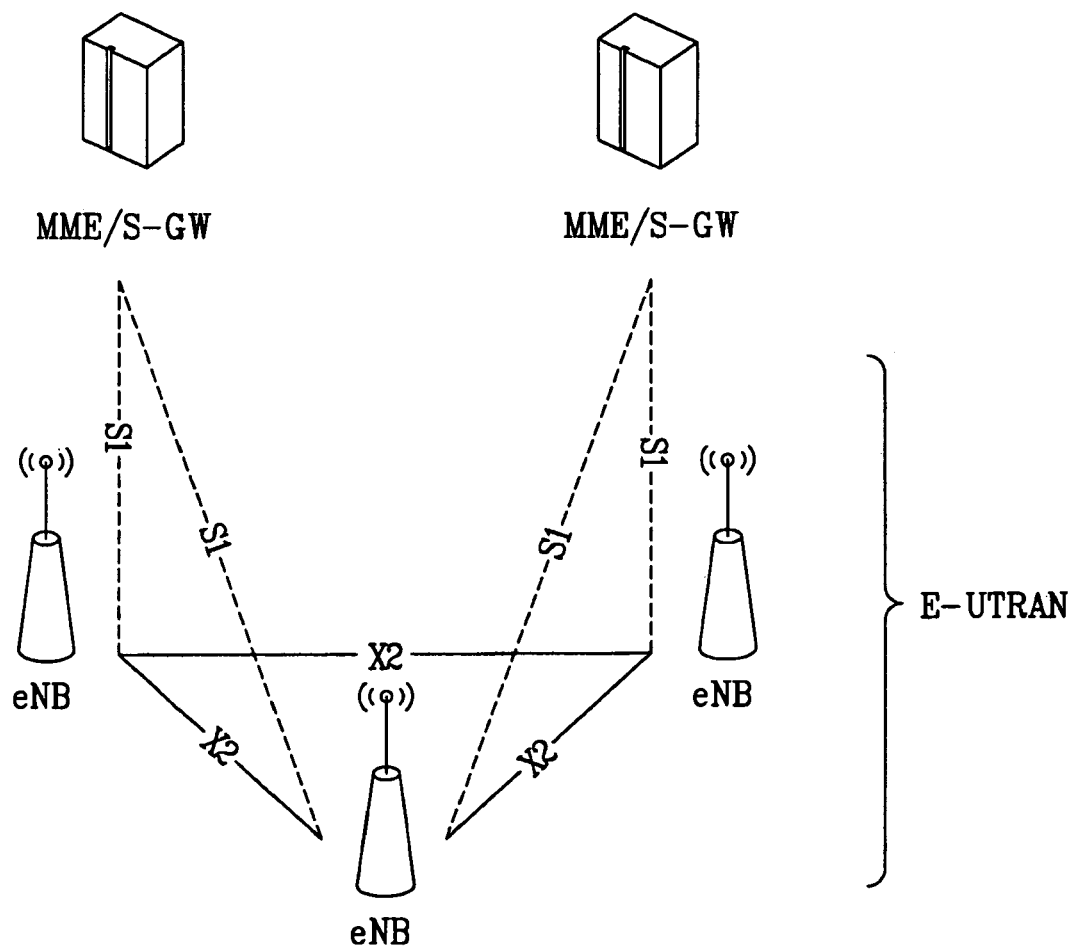
FIG. 3 illustrates a network structure of the E-UMTS.

FIG. 3 shows a network structure of the E-UMTS. The E-UMTS system is an evolved version of the conventional WCDMA UMTS and basic standardization thereof is in progress under the 3rd Generation Partnership Project (3GPP). The E-UMTS is also referred to as a Long Term Evolution (LTE) system. See "http://www.3gpp.org/ftp/Specs/2006-12/" and "http://www.3gpp.org/ftp/Specs/html-info/GanttChart-Level-2.htm" for details of the technical specifications of the UMTS and E-UMTS.

As shown in FIG. 3, the E-UTRAN includes base stations which will be referred to as "eNode B" or "eNB" for short. The eNBs are connected through X2 interfaces. Each eNB is connected to User Equipments (UEs) through a radio interface and is connected to an Evolved Packet Core (EPC) through an S1 interface. The EPC includes a Mobility Management Entity (MME)/System Architecture Evolution (SAE) gateway.

Radio interface protocol layers between UEs and the network can be divided into an L1 layer (first layer), an L2 layer (second layer), and an L3 layer (third layer) based on the lower three layers of the Open System Interconnection (OSI) reference model widely known in communication systems. A physical layer included in the first layer among these layers provides an information transfer service using a physical channel and a Radio Resource Control (RRC) layer located in the third layer controls radio resources between UEs and the network. To accomplish this, the RRC layer exchanges RRC messages between UEs and the network. The RRC layer may be provided in a distributed manner over network nodes such as Node Bs and AGs and may also be individually provided in a Node B or an AG.

Figure 4:
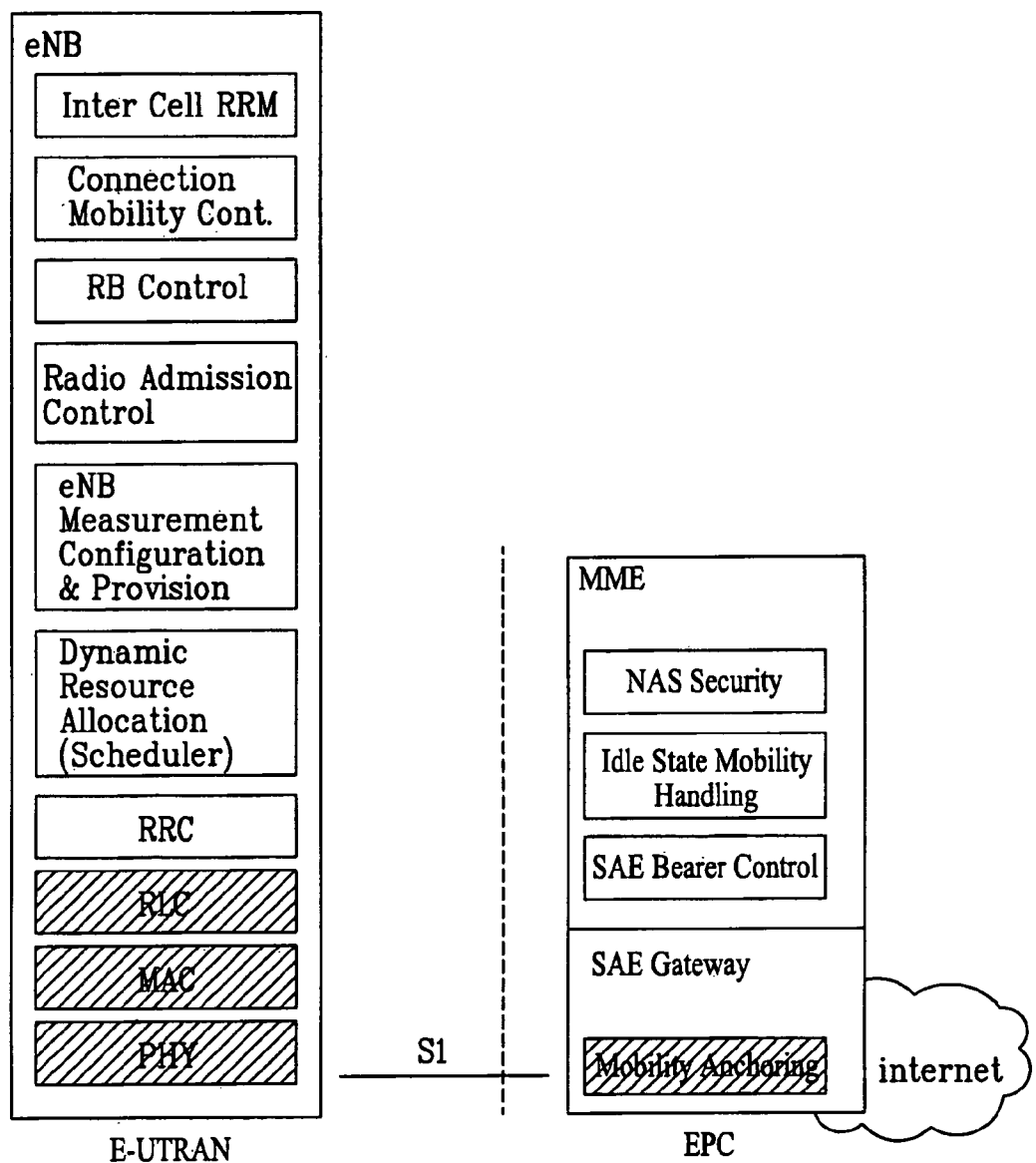
FIG. 4 schematically illustrates an Evolved Universal Terrestrial Radio Access Network (E-UTRAN)

FIG. 4 schematically illustrates an Evolved Universal Terrestrial Radio Access Network (E-UTRAN). In FIG. 4, hatched portions denote functional entities of the user plane and unhatched portions denote functional entities of the control plane.

Figure 5A:
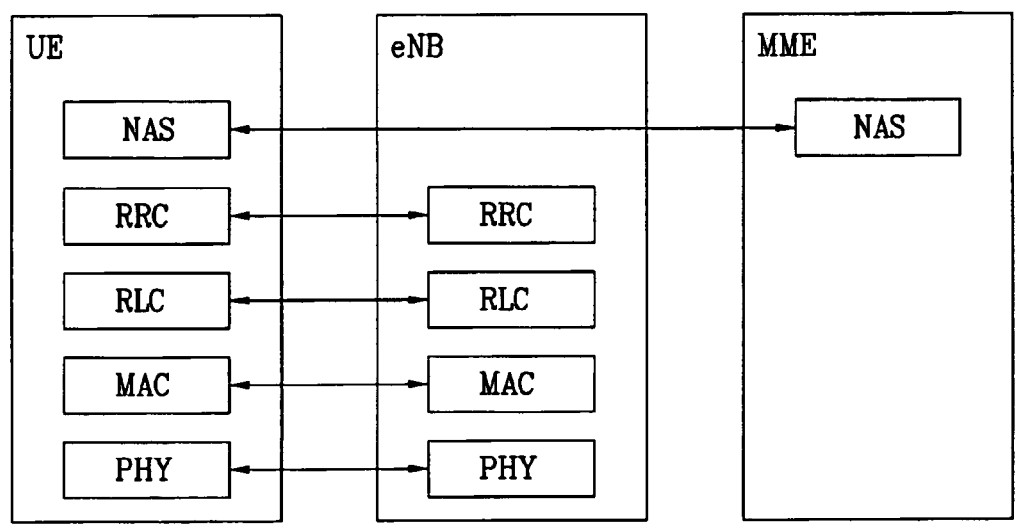
FIGS. 5A and 5B illustrate control-plane and user-plane radio interface protocol structures between a UE and the E-UTRAN, respectively.
Figure 5B:
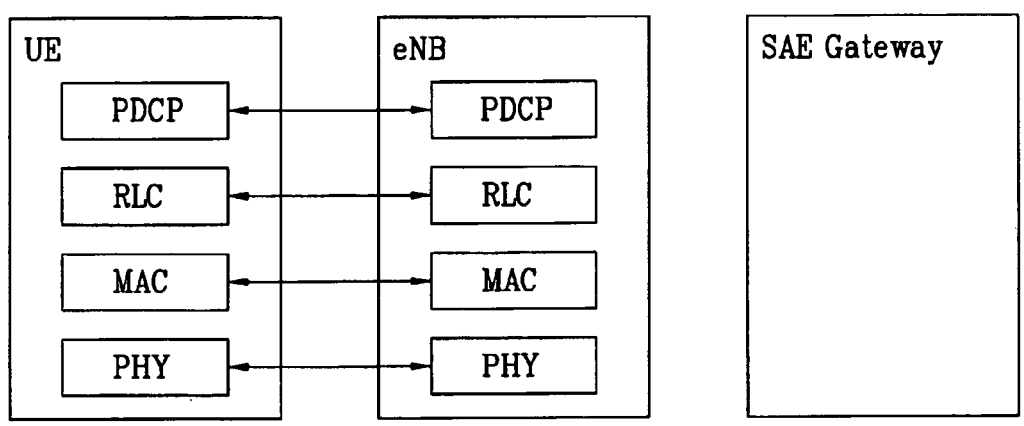

FIGS. 5A and 5B illustrate control-plane and user-plane radio interface protocol structures between a UE and an E-UTRAN, respectively. The radio interface protocol of FIGS. 5A and 5B is divided horizontally into a physical layer, a data link layer, and a network layer and vertically into a user plane for data information transmission and a control plane for signaling. The protocol layers of FIGS. 5A and 5B can be divided into an L1 layer (first layer), an L2 layer (second layer), and an L3 layer (third layer) based on the lower three layers of the Open System Interconnection (OSI) reference model widely known in communication systems.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. In the E-UMTS, the physical channel is modulated according to the Orthogonal Frequency Division Multiplexing (OFDM) method, using time and frequencies as radio resources.

The MAC layer, which is the second layer, provides a service to a Radio Link Control (RLC) layer, located above the MAC layer, through a logical channel. The RLC layer of the second layer supports reliable data transfer. A PDCP layer of the second layer performs a header compression function to reduce unnecessary control information in order to efficiently transmit data through IP packets such as IPv4 or IPv6 packets in a radio interval with a relatively small bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the UTRAN.

Downlink transport channels used to transmit data from the network to the UE include a Broadcast Channel (BCH) used to transmit system information, a Paging Channel (PCH) used to transmit paging messages, and a downlink Shared Channel (SCH) used to transmit user traffic or control messages. Control messages or traffic of a downlink multicast or broadcast service may be transmitted through a downlink SCH and may also be transmitted through a downlink multicast channel (MCH). Uplink transport channels used to transmit data from the UE to the network include a Random Access Channel (RACH) used to transmit initial control messages and an uplink SCH used to transmit user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH). In the E-UMTS system, Orthogonal Frequency Division Multiplexing (OFDM) is used in downlink and Single Carrier-Frequency Division Multiple Access (SC-FDMA) is used in uplink. The OFDM system, which is based on a multicarrier scheme, allocates resources in units of groups of subcarriers, which are part of a carrier, and uses Orthogonal Frequency Division Multiple Access (OFDMA) as an access method.

Figure 6:
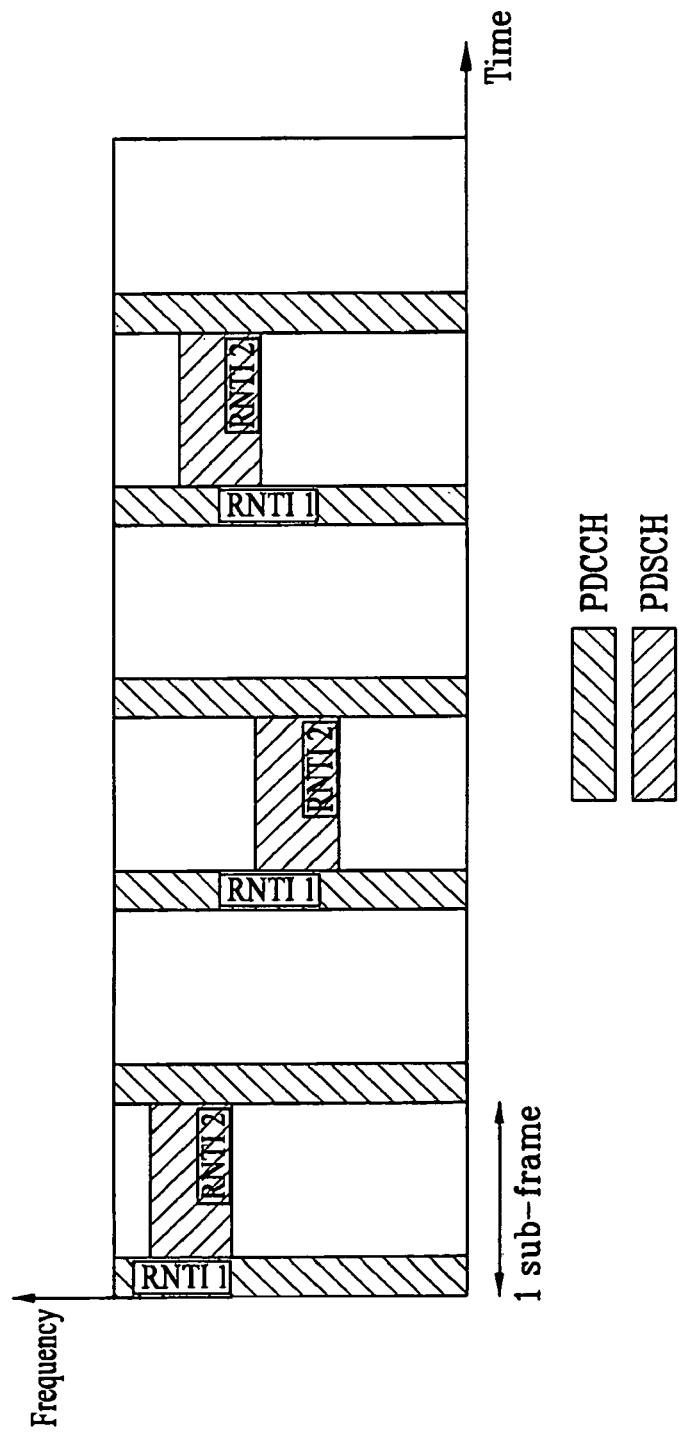
FIG. 6 illustrates a data frame structure to explain an embodiment of the invention.

FIG. 6 illustrates a data frame structure to explain an embodiment of the invention.

As shown in FIG. 6, a BS adds an error detection code, generated using a first identifier allocated to a UE, to DL scheduling information for data transmission to the UE and transmits the DL scheduling information to which the error detection code has been added to the UE through a PDCCH. Then, the BS adds an error detection code, generated using a second identifier allocated to the UE, to data to be transmitted to the UE and transmits the data to which the error detection code has been added to the UE through a PDSCH. More specifically, in the case where the BS transmits DL scheduling information to a UE through a PDCCH in the embodiment of FIG. 6, the BS adds an error detection code generated using a first identifier allocated to the UE to the DL scheduling information to be transmitted to the UE, instead of incorporating the first identifier into the DL scheduling information such that the first identifier is part of the DL scheduling information. In the case where the BS transmits user data to a UE through a PDSCH, the BS adds an error detection code generated using a second identifier allocated to the UE to the user data to be transmitted to the UE, instead of incorporating the second identifier into the user data such that the second identifier is part of the DL scheduling information.

The error detection code is a code which the transmitting side adds to data to be transmitted to the receiving side in a communication system to allow the receiving side, which has received the data, to determine whether or not an error occurred during transmission of the data to the receiving side. The most widely used error detection code is a Cyclic Redundancy Check (CRC) code. Algorithms for generating a CRC code are well known. One example of the method for generating a CRC code using a specific UE identifier is to generate a CRC code through the CRC code generation algorithm using the UE identifier as an input to the algorithm. A different type of error detection code other than the CRC code may also be used.

The UE receives data from the BS using the first identifier and the second identifier allocated to the UE. Specifically, the UE monitors a PDCCH using the first identifier every Transmission Time Interval (TTI) or every specific time interval to determine presence or absence of DL scheduling information destined for the UE. Here, the UE attempts to decode a CRC code added to the DL scheduling information using the first identifier and determines that the scheduling information is destined for the UE if the decoding is successful. After the UE determines through the CRC check that the scheduling information received through the DPCCH is destined for the UE, the UE receives data transmitted from the UE through a DPSCH using the received scheduling information. The UE attempts to decode a CRC code added to the data received through the DPSCH using the second identifier and determines that the data is destined for the UE if the decoding is successful. The UE transmits an ACK to the BS in response to the data received through the DPSCH. The UE discards the data if the decoding of the data using the second identifier fails.

In another embodiment, the BS generates a CRC code to be added to DL scheduling information, which is to be transmitted through a DPCCH, and a CRC code to be added to data, which is to be transmitted through a DPSCH, using a first identifier allocated to the UE and adds the CRC codes respectively to the DL scheduling information and the data and then transmits the DL scheduling information and the data to which the CRC codes have been added. On the other hand, the BS incorporates a second identifier allocated to the UE into the data to be transmitted through the DPSCH. The UE attempts to perform CRC code decoding of the DL scheduling information received through the DPCCH using the first identifier and receives the data through the DPSCH if the decoding is successful. The UE also attempts to perform CRC code decoding of the data received through the DPSCH using the first identifier and checks whether or not the received data includes the second identifier if the decoding is successful. The UE determines that the data is destined for the UE if the received data includes the second identifier.

The embodiments of the invention described above can be applied when data communication between a UE and a BS is performed using two identifiers allocated to the UE. For example, in wireless communication systems using group scheduling, each UE is allocated a group identifier (group RNTI) used to identify a group including the UE and a UE identifier (UE RNTI) used to identify the UE. The group identifier can be used as the first identifier and the UE identifier can be used as the second identifier.

In the UMTS or E-UMTS, the term "Radio Network Temporary Identifier (RNTI)" is used to refer to a UE identifier. The RNTI is classified into a dedicated RNTI and a common RNTI. The dedicated RNTI is an RNTI which a network allocates to a specific UE, when the UE has entered the network and then been registered in a specific BS, so that the UE uses the RNTI to communicate with the network. The common RNTI is an RNTI which a network temporarily allocates to a specific UE when the UE has not entered the network so that information of the UE has not been registered in any specific BS. The common RNTI is used to transmit information such as system information which is commonly used by a plurality of UEs. For example, an RA-RNTI or a temporary C-RNTI, which is allocated to a UE which has transmitted a random access preamble to a BS in a random access procedure, is a common RNTI. A BS or Core Network (CN) may allocate the dedicated RNTI to a specific UE. Specifically, the BS may allocate a dedicated RNTI to a specific UE using an RRC connection establishment message such as an RRC connection setup message or an RRC connection reset message in an RRC connection establishment procedure. The CN may set a dedicated RNTI for a specific UE using a NAS setup message such as an ATTACH ACCEPT message or a TRACKING AREA UPDATE ACCEPT message.

In the case where a specific UE has both a dedicated RNTI and a common RNTI such as an RA-RNTI or a temporary C-RNTI in a random access procedure which is performed through a Random Access Channel (RACH), the BS can send a message to the UE according to the embodiments of the invention as described above. Here, the common RNTI can be used as the first identifier, described above in the embodiments, and the dedicated RNTI can be used as the second identifier. The common RNTI may also be used as the second identifier while the dedicated RNTI is used as the first identifier. In this case, the PDCCH or PDSCH used in the above embodiments of the invention can be changed to another channel.

The above embodiments are provided by combining components and features of the invention in specific forms. The components or features of the invention should be considered optional if not explicitly stated. The components or features may be implemented without being combined with other components or features. The embodiments of the invention may also be provided by combining some of the components and/or features. The order of the operations described above in the embodiments of the invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The above embodiments of the present invention have been described focusing on the data communication relationship between a UE (or user equipment) and a BS. Specific operations which have been described as being performed by the BS may also be performed by upper nodes as needed. That is, it will be apparent to those skilled in the art that the BS or any other network node may perform various operations for communication with user equipments in a network including a number of network nodes. The term "base station (BS)" may be replaced with another term such as "fixed station", "Node B", "eNode B (eNB)", or "access point". The term "user equipment" may also be replaced with another term such as "user equipment (UE)", "mobile station (MS)", "mobile station (MS)", or "mobile subscriber station (MSS)".

The embodiments of the invention can be implemented by hardware, firmware, software, or any combination thereof. In the case where the invention is implemented by hardware, an embodiment of the invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the invention is implemented by firmware or software, the method for transmitting and receiving data in a wireless communication system according to an embodiment of the invention may be implemented in the form of modules, processes, functions, or the like which perform the features or operations described above. Software codes can be stored in a memory unit so that they can be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The present invention can be applied to wireless communication systems such as mobile communication systems and wireless Internet systems.

The invention claimed is:

1. A method for transmitting data from a network to a user equipment in a wireless communication system, the method comprising:

adding an error detection code, generated using a first identifier allocated to the user equipment, to scheduling information for data to be transmitted to the user equipment;

transmitting the scheduling information to which the error detection code has been added to the user equipment;

adding an error detection code, generated using a second identifier allocated to the user equipment, to the data to be transmitted to the user equipment, wherein the second identifier is not included in the data; and transmitting the data to which the error detection code has been added to the user equipment, wherein decoding, of the error detection code added to the data is executed if decoding, of the error detection code added to the scheduling information, is successful, wherein the first identifier is a group identifier used to identify a user equipment group including the user equipment and the second identifier is a user equipment identifier used to identify the user equipment.

2. The method according to claim 1, wherein the error detection code is a Cyclic Redundancy Check (CRC) code.

3. A method for receiving data transmitted from a network at a user equipment in a wireless communication system, the method comprising:

receiving scheduling information transmitted from the network through a control channel, the scheduling information including an error detection code that has been added to the scheduling information by the network;

decoding the error detection code added to the scheduling information using a first identifier that the network has allocated to the user equipment;

receiving data transmitted from the network through a data channel using the scheduling information, the data including an error detection code that has been added to the data by the network; and if the decoding, of the error detection code added to the scheduling information, is successful, decoding the error detection code added to the received data using a second identifier that the network has allocated to the user equipment, wherein the second identifier is not included in the received data, wherein the first identifier is a group identifier used to identify a user equipment group including the user equipment and the second identifier is a user equipment identifier used to identify the user equipment.

4. The method according to claim 3, further comprising transferring the received data to an upper layer if the decoding, of the error detection code added to the data, is successful.

5. The method according to claim 3, further comprising discarding the received data if the decoding, of the error detection code added to the data, is unsuccessful.

6. The method according to claim 3, wherein the error detection code is a Cyclic Redundancy Check (CRC) code.

* * * * *